A. A. WEBSTER.
LUBRICATOR.
APPLICATION FILED AUG. 18, 1908.
922,223.
Patented May 18, 1909.
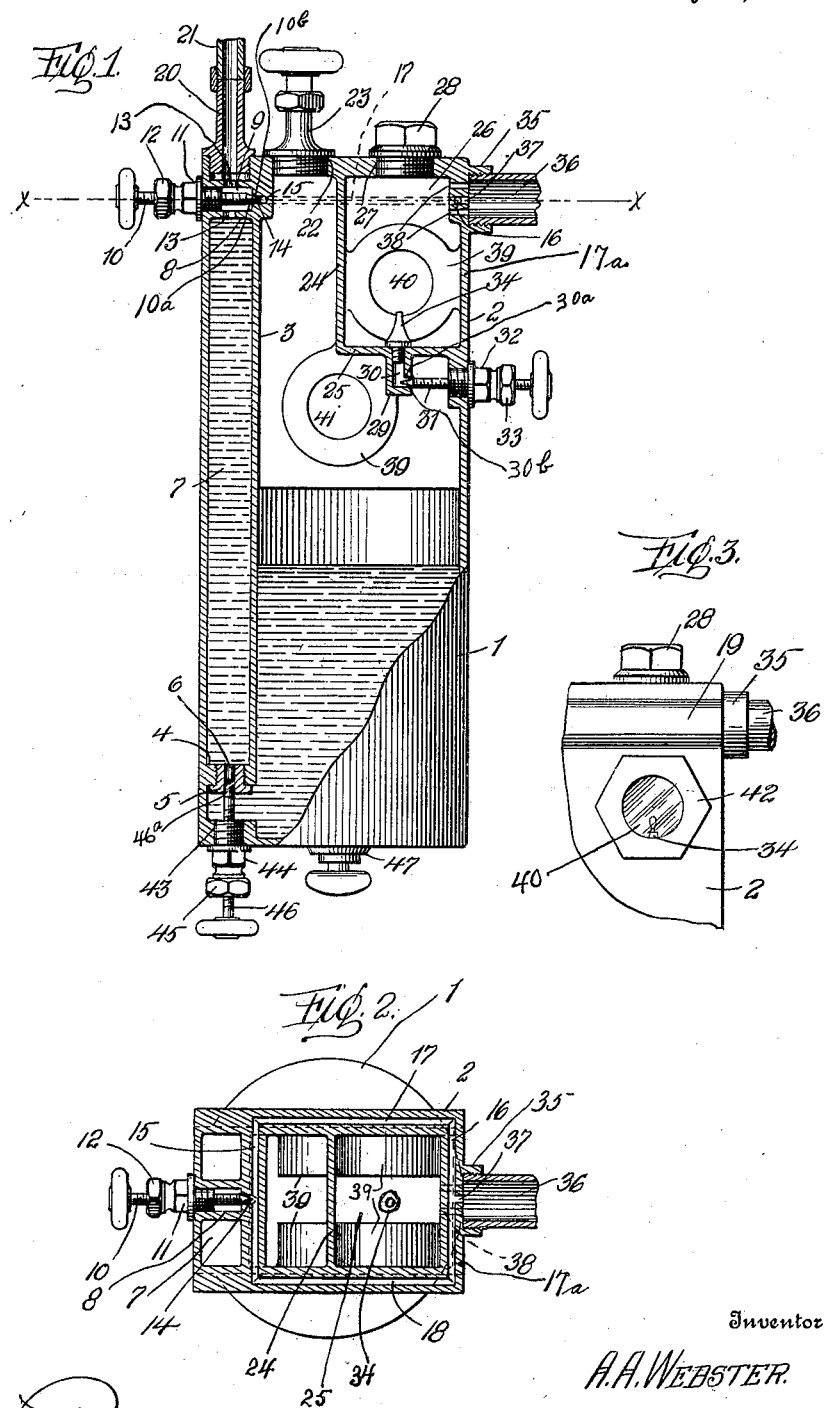

UNITED STATES PATENT OFFICE.

ALBERT A. WEBSTER, OF PITTSBURG, PENNSYLVANIA.

LUBRICATOR.

No. 922,223.  Specification of Letters Patent.  Patented May 18, 1909.

Application filed August 18, 1908. Serial No. 449,124.

*To all whom it may concern:*

Be it known that I, ALBERT A. WEBSTER, a citizen of the United States of America, residing at Pittsburg, in the county of Allegheny and State of Pennsylvania, have invented certain new and useful Improvements in Lubricators, of which the following is a specification, reference being had therein to the accompanying drawing.

This invention relates to lubricators, particularly designed for use in connection with the steam supply line of a steam chest and valves of an engine.

The object of my invention is to provide a simple and inexpensive lubricator, wherein positive and reliable means is employed for maintaining the grease or oil within the lubricator in a liquid or workable state, preventing freezing or coagulation.

My invention is an improvement upon that type of lubricators shown in Patents 803,296 and 803,297, the improvement principally residing in dispensing with the multiplicity of elements disclosed in the above mentioned patents, and to simplify the invention to that extent, I provide a self-contained lubricator consisting of comparatively few parts easily and quickly assembled.

My improvement will be presently described and then specifically pointed out in the appended claims, and reference will now be had to the accompanying drawing, wherein, Figure 1 is an elevation of my lubricator partly broken away and partly in section, Fig. 2 is a horizontal sectional view of the same, taken on the line x—x of Fig. 1, and Fig. 3 is a side elevation of a portion of the lubricator.

Referring to the drawings in detail, 1 designates a cylindrical receptacle constituting a reservoir and which has connected with the top thereof a rectangular casing 2 corresponding in length to the diameter of the receptacle 1, but of a width less than the diameter of said receptacle 1. The casing 2 opens into the receptacle 1 and is provided with a vertically extending partition 3 which is of a length as to extend in proximity to the bottom of the receptacle 1. The lower end of the partition 3 is connected with the receptacle 1 by an integral narrow partition 4 having a screw-threaded opening in which is secured a threaded plug 5 formed with a port 6. The partitions 3 and 4 in connection with one wall of the casing 2 and with the wall of the receptacle 1 forms a condensing chamber 7 which communicates with the interior of the receptacle 1 through the medium of the port 6.

The partition 3 is formed integral with the top of the casing 2 and is provided near its upper end with a laterally extending cylindrical enlargement 8 which is formed integral with one end wall of the casing 2. The enlargement 8 is hollow and constitutes a valve chamber 9. Secured in one end of the enlargement 8 is a screw-threaded plug 11 and extending through said plug 11 and a packing nut 12 is a valve stem 10, the inner end of which is tapered as at $10^a$ to constitute a valve and which engages a seat $10^b$ formed in the partition 3. The enlargement 8 is provided with vertically alining openings 13 and the partition 3 with a port 14. Arranged in the partition 3 at the top thereof, the upper portion of said partition being enlarged for such purpose, is a transversely extending channel 15 which communicates with the port 14. Each side wall of the casing 2 is formed near its top with a longitudinally extending channel, these channels are indicated by the reference characters 17 and 18 and communicate with the channel 15. The end wall $17^a$ of the casing 2 is formed with a transversely extending channel 16 which communicates with the channels 17 and 18. The side walls of the casing 2 at the top are enlarged as at 19 and in the said enlargements are arranged the ports 17 and 18.

The top of the casing 2 directly above the enlargement 8 is formed with a screw-threaded opening to which is connected a coupling 20 having attached thereto a steam inlet pipe 21. The top of the casing 2 is furthermore provided with a filling opening 22 which has the wall thereof screw-threaded whereby a closure plug 23 for said opening can be secured to the top. The opening 22 permits of the filling of the reservoir formed by the receptacle 1. The top of the casing 2 is furthermore provided with an opening 27 having the wall thereof screw-threaded, said opening being adapted to be closed by a threaded plug 28 which engages the threads on the wall of the opening 27. The opening 27 allows of access to be had to a collecting chamber 26 formed through the medium of a vertical partition 24, the end wall 17ª and a horizontal partition 25. The partition 24 is formed integral with and depends from the top of the casing 2 and the partition 25 is formed integral with the partition 24 and with the inner face of the end wall 17ª. Depending from the lower face of the partition 25 is a hollow extension 29 forming a small chamber 30 which opens into the interior of the casing 2 through the medium of a port 30ª and which can be closed by a valve 30ᵇ formed on the end of the valve stem 31. The latter extends through a plug 32 secured in the wall 17ª and also through a packing nut 33 which engages the plug 32. Mounted upon the partition 25 and extending into the chamber 30 is a detachable nipple 34 which is positioned through the opening 27. The end wall 17ª of the casing is formed near its top with an interiorly threaded boss 35 to which is attached a steam line 36 communicating with the channel 16 by a port 37 formed in the end wall 17ª and with the collecting chamber 26 by the ports 38 formed in the end wall 17ª of the casing 2. The sides of the casing 2 are formed with internal enlargements 39 having pockets for the reception of sight-glasses 40 and 41, which are secured in position by jam-nuts 42. The sight-glasses 41 and 40 permit of observing action of the lubricant in the casing 2 and in the collecting chamber 26.

The bottom of the receptacle 1 is formed with an opening 43 having the wall thereof screw-threaded and to which is connected a plug 44 having abutting thereagainst a packing nut 45. Extending through the plug 44 and packing nut 45 is a screw-threaded valve stem 46 having a tapered end 46ª to constitute a valve. The valve 46ª is adapted to extend in the port 6 whereby communication between the condensing chamber 7 and the interior of the receptacle 1 can be controlled. A drain valve 47 is secured in the bottom of the receptacle 1 to facilitate the cleansing of the reservoir formed by the said receptacle.

In the operation of the lubricator, the reservoir is placed in a suitable position near the engine with the boss 35 connecting with the steam line 36 which supplies the steam chest and valves on the engine. The screw-threaded valve stem 46 is then adjusted to have the valve 46ª close the port 6. The reservoir is then filled with lubricant through the opening 22. By regulating the steam supply from the coupling 20 through the medium of the valve 10ª, the steam from the pipe 21 will begin to condense in the chamber 7, the condensate accumulating in the bottom of said chamber. Simultaneously with the condensing action, the steam passes through port 14, channels 15, 17, 18, 16 and port 37 into the steam line 36, the passage of steam through these ports and channels maintaining the walls of the casing 2 and the collecting chamber 26 in a warm condition, conducive to maintaining the lubricant in a workable condition. If at this point the valves 46ª and 30ᵇ are opened, the weight of the condensate over and above the boiler pressure will raise the body of the lubricant within the reservoir and retain it in the upper portion of said reservoir and the casing 2. A portion of the lubricant will reach the nipple 34, and by its own buoyancy and the hydrostatic pressure in the reservoir keeping the chamber filled, it will pass upwardly through the condensate in the collecting chamber 26. On reaching the top of this chamber, the drops of lubricant will be drawn to the ports 38 into the steam line 36 and from there conveyed to the engine.

It will be observed that at no time during the operation of the lubricator does the lubricant assume an elevation above the ports 38, and that through the medium of the surrounding channels 15 to 18 inclusive for the passage of the steam, the lubricant will float on the water and be maintained in a liquid and workable state.

Having now described my invention what I claim as new, is:—

1. A lubricator comprising a reservoir, a casing carried thereby and communicating with said reservoir, said casing and reservoir having a vertical partition formed therein providing a condensing chamber adapted to communicate with said reservoir, a valve controlling the communication between said condensing chamber and said reservoir, said casing having partitions arranged therein providing a collecting chamber, one of said partitions having a depending portion provided with a port for establishing communication between said collecting chamber and said casing, a nipple mounted in said port, a valve for controlling the communication between said collecting chamber and said casing, a steam supply pipe connecting with said condensing chamber, a steam-line communicating with said collecting chamber, said casing having channels surrounding the collecting chamber and establishing communication between said steam supply pipe and said steam-line, and means for controlling the admission of steam to said ports.

2. A lubricator comprising a reservoir, a casing carried thereby and communicating therewith, said casing and said reservoir having a vertical partition formed therein providing a condensing chamber adapted to communicate with said reservoir, means for controlling the communication between said condensing chamber and said reservoir, said casing having partitions formed therein providing a collecting chamber adapted to communicate with said casing, means for controlling the communication between said collecting chamber and said casing, a steam supply pipe connecting with said casing and communicating with said condensing chamber, a steam-line connecting with said casing and in communication with said collecting chamber, said casing having channels surrounding said collecting chamber and establishing communication between said steam supply pipe and said steam-line, said channels forming conductors for a heating medium.

3. A lubricator comprising a reservoir, a casing carried thereby and communicating with said reservoir, said casing and said reservoir having a condensing chamber formed therein adapted to communicate with said reservoir near the bottom thereof, said casing having a collecting chamber formed therein adapted to communicate with said reservoir, a steam supply pipe connecting with said casing and communicating with said condensing chamber, a steam-line connecting with said casing and in communication with said collecting chamber, said casing having steam conducting channels surrounding said collecting chamber and establishing communication between said steam supply pipe and said steam-line.

4. A lubricator comprising a receptacle constituting a reservoir, a casing carried by said receptacle and opening thereinto, said casing and receptacle provided with means to constitute a condensing chamber, said chamber having its bottom in proximity to the bottom of the receptacle, said casing having a collecting chamber at the top thereof, said chamber having its bottom provided with means for establishing communication between the condensing chamber and the reservoir, a steam supply pipe connected with said casing, a steam line connected with said casing, means for regulating the steam supply, said casing being provided with steam conducting channels surrounding said collecting chamber and establishing communication between the steam supply pipe and the steam line.

5. In combination, a reservoir, a casing in communication with said reservoir, a collecting chamber within said casing and in communication therewith, a steam-line pipe in communication with said collecting chamber, a steam supply pipe in communication with said reservoir and with said steam-line pipe through the medium of channels in the walls of said casing, said channels surrounding the steam collecting chamber.

6. In combination, a lubricant reservoir, a casing carried thereby and provided with a partition, a steam supply pipe connecting with said casing, a steam-line pipe connecting with said casing, and steam conducting means formed in said partition and the walls of said casing for establishing communication between said steam-line pipe and said steam supply pipe.

7. In combination, a casing, a collecting chamber in communication with said casing, a steam supply pipe connecting with said casing, a steam line pipe connecting with said casing and in communication with said collecting chamber, and said casing provided with longitudinally and horizontally extending channels surrounding said collecting chamber for heating the same and further for establishing communication between said steam supply pipe and said steam-line pipe.

8. In combination a receptacle constituting a reservoir, a casing communicating with said reservoir, a collecting chamber within said casing and adapted to communicate therewith, means for controlling communication between the casing and the collecting chamber, a steam line pipe, said casing provided with means for establishing communication between said steam line pipe and said collecting chamber, a steam supply pipe connected to said casing, and means formed in the walls of said casing for establishing communication between said steam line pipe and said steam line, said means surrounding said collecting chamber.

9. In combination a receptacle constituting a reservoir, a casing communicating with said reservoir, a collecting chamber within said casing and adapted to communicate therewith, means for controlling communication between the casing and the collecting chamber, a steam line pipe, means for establishing communication between said steam line pipe and said collecting chamber, a steam supply pipe connected to said casing, means formed in the walls of said casing for establishing communication between said steam supply pipe and said steam line, said means surrounding said collecting chamber, and means for controlling the communication between the steam supply and the steam line.

10. In combination a receptacle constituting a reservoir, a casing communicating with said reservoir, a collecting chamber within said casing and adapted to communicate therewith, means for controlling communication between the casing and the collecting chamber, a steam line pipe, said casing provided with means for establishing communication between said steam line pipe and said collecting chamber, a steam supply pipe connected to said casing, means formed in the walls of said casing for establishing communication between said steam supply pipe and said steam line, said means surrounding said collecting chamber, means for controlling the communication between the steam supply and the steam line, a condensing chamber extending through said casing and into said reservoir and with which said steam supply pipe communicates, and condensing chamber having its bottom provided with means for establishing communication between the condensing chamber and the reservoir at the bottom of the latter.

In testimony whereof I affix my signature in the presence of two witnesses.

ALBERT A. WEBSTER.

Witnesses:
BLANCHE BEST,
EARL TERMAN.